United States Patent Office 3,850,902
Patented Nov. 26, 1974

3,850,902
PROCESS FOR CASTING EYEGLASS FRAMES
Richard T. Metcalfe, Sturbridge, Peter R. Ramirez, Southbridge, and Chester M. Slyk, Auburn, Mass., assignors to American Optical Corporation Southbridge, Mass.
No Drawing. Continuation of abandoned application Ser. No. 816,371, Apr. 15, 1969. This application July 22, 1971, Ser. No. 165,589
Int. Cl. B29c 25/00; B29d 12/02
U.S. Cl. 264—102
8 Claims

ABSTRACT OF THE DISCLOSURE

Eyeglass frames and parts thereof are cast from a liquid epoxy resin by initially forming a mold of the desired shape of the eyeglass frames and part thereof, mixing low viscosity epoxy resin precursor (such as bisphenol A with epichlorohydrin) with a low molecular weight amine hardener, preheating the liquid reactants to a temperature less than 200° F. for degasification of the liquid, injecting the preheated resin, in the absence of air into the mold cavity, heating the mold and contained resin to a temperature of about 200° F. for a sufficient time to complete the reaction of the reactants, and then removing the completed frame from the mold. The frame is distorted as it is removed from the mold and is subjected to a liquid cooling bath to restore the molded configuration.

---

This application is a continuation of our earlier filed copending application Ser. No. 816,371, filed Apr. 15, 1969, now abandoned.

The majority of commercial ophthalmic mountings, or eyeglass frames, and temples, have been made by the injection molding of cellulose acetate, which contains a substantial percentage of plasticizers of various types, and by cutting from sheet stock and machining. The injection molded acetate frames require considerable reworking before the frames will accept and hold lenses, and the temples can be secured to the lens frames. This is due to the fact that the molds are rigid metal molds and undercuts, overhangs and the like cannot be molded easily into the frames but must be machined into the blank frame. Additionally, the metal molds are extremely expensive, and require a long period of waiting for the production of the molds. Obviously, the economic factors involved including cost and time limit the number of different styles and sizes of frames that may be made, besides greatly increasing the cost of the frames. Most such molds form flat frames which are reheated to soften then curved in a press. Other molds have been proposed with knock-out sections for forming undercuts, curves and the like. Also, flexible inserts have been proposed in the rigid molds, for making undercuts etc., but this increases hand labor and the resultant cost.

According to the present invention, there is provided a process for casting epoxy resin, ophthalmic resins in flexible molds which is a fast economical process for producing strong, very stable eyeglass frames. The molds used for the present invention are of the flexible type, formed of urethane, silicone rubber or similar materials, which permits casting of undercuts, overhangs and curves for lens grooves, bevels, contours and the like in eyeglass frames. Models for use with the present invention may be made from an acetate model, carved from wood, plastic or the like, cast into a urethane or silicone rubber split mold. The mold-forming process involves placing a liquid rubber precursor into a mold box. Since the liquid material flows into the cavities, undercuts, etc. of the mold, inexpensive flexible molds may be utilized to produce essentially finished frames. As the resin during casting of the frames does not expand (excepting that minor change in volume due to temperature considerations), but may shrink very slightly upon curing, the flexible urethane or silicone rubber molds are satisfactory for producing a lens frame with reasonable tolerances, including undercuts such as grooves, bevels, contours and the like. The resin and hardener mixture is preferably degased prior to injecting into molds, and one method of degassing involves placing the mixed liquids in a vacuum chamber at 20 or more inches of mercury for a period of time (5–30 minutes) depending on the entrapped gas from the mixing procedure. In some commercial operations degassing may not be necessary as mixing, metering and dispensing equipment is available which injects substantially air-bubble free liquids. By using a degasified liquid resin, and in one case using a closed pressure system to prevent introduction of air with the resin during pouring, frames were produced and temples have no air bubbles. In a preferred form, the molds are made with the cavities vertical (lens frame above lens frame), and the resin is injected into the bottom of the cavity so that the resin fills the cavity from the bottom up to further prevent bubble formation which may carry over in the finished frames. Further, the liquid resin precursors may be preheated to below decomposition temperature or placed under vacuum, further degasifying the resins products. The heating decreases the viscosity of the liquids which permits the resin to easily fill the cavities without air bubbles. The epoxy resin is readily cured by heating to approximately 200° F. (or in a range of about 170°–250° F.) The resin itself exotherms to temperatures of 350° F. or so, for short periods, on the order of 5 to 15 minutes, or it may be cured by standing for longer periods at about room temperature. The cast parts are then degated, and the parting lines may be removed by tumbling or hand finishing. If a rigid mold is used the lens groove and coquille shapes must be added by additional machining operations or the like, where desirable, hinges and other metal parts may be placed in the mold and cast directly in the frame.

As a specific example, a bisphenol A type and epichlorohydrin epoxy yielding composition called Hysol R–9–2039 manufactured by the Hysol Chemical Company is mixed on the basis of 100 to 30 parts, by weight, of the R–9–2039 to an amine hardener (one preferred product being sold under the name of H2–3561, also, manufactured by Hysol Chemical Company). The liquid mixture of precursors of the resin (phenol-epoxy and hardener) is heated to a temperature under 200° F. This reduces viscosity and degasses the liquid, however, the liquid after mixing may be degassed by placing in a vacuum for a few minutes. The preheated mixture is then placed into a mold either under pressure, vacuum or normal atmospheric pressure in such a manner as to prevent entrapment of air, generally in accordance with conventional molding practices. The pressure molding being the procedure of preference. In preferred practice, after casting but while the mixture is still liquid, it is placed under a pressure of at least 25 pounds per square inch and preferably 50 to 100 pounds per square inch. The liquid materials are then heated, for example in the mold to a temperature of approximately 200° F. while polymerization proceeds after which the mold is opened and the cured epoxy part is removed. Upon removal of the cast epoxy part, since it is still hot (200° F. or more) it may and usually does deform. The part is therefore placed in warm water (100 to 150° F.) which causes it to rigidify and return to its cast configuration. It seems the cast part has a "memory." The remnant high temperature primarily is due to the exothermic reactions which took place in the part during the resin polymerization. Sometimes we cool the mold before stripping. This can be done by immersing in water. The water for cooling either the cast part and/or mold can be at any temperature below boiling which will rigidify the part. Liquids other than water may be used.

A number of distinct advantages over prior methods of molding cellulose acetate frames are provided with the epoxy resin casting methods of the present invention. First of all, the mold costs are considerably less for the cast epoxy frames than the very expensive machined rigid metal molds for the cellulose acetate injection molding. Additionally, a substantially shorter waiting period is experienced during manufacture of the flexible molds over the rigid molds of the prior art. The precursors for the epoxy resin and hardener may be stored for a considerable length of time thus, reducing the waiting time for the raw materials for the frames, and, also, reducing warehouse problems. The flexible molds provide complete freedom of design which includes undercuts, overhangs, contourings, sculpturing or the like. The low cost of the molds provides an economy for a short production run. The storage of uncolored precursors which is colored as molded, provides a simple means of producing short runs of colored frames very economically and with little or no waiting time or waste of material.

Various other epoxy resins may be used in the process, however, it is desired to maintain the lowest molecular weight possible commensurate with obtaining necessary strength, flexibility and the like. Commercially available precursors for epoxies are a mixture of molecular weights, and the lowest viscosity of the mixture is desired for the best casting. The commercial mixture is a phenol-epoxy composition and is classified, among other characteristics, by the viscosity of the mixture. For eyeglass frames and parts, the viscosity should be less than about 20,000 centipoises at 25° C. with an optimum of 500 centipoises at 25° C. On heating, the viscosity, of course, is reduced. Also, the liquids are 100% solid solutions (i.e. 100% reactive) for producing the desired resin having a short pot life at reaction temperatures and clarity for coloring.

The phenol composition must be at least a dihydric phenol and may include such compositions as bisphenol A, catechol, resorcinol, hydroquinone, pyrogallol, phloroglucinol, and the like. When the precursors are preheated for degassing, the viscosity, of course, is reduced.

Various types of hardening agents may be used, and these include primary, secondary and tertiary aliphatic and aromatic amines. Polyfunctional aliphatic amines, which includes such compounds as diethylene, triethylene triamine, are, likewise, effective hardeners. Complex and adduct amines may, also, be used and these include high molecular weight polyamines with epoxy resins. Versamids may be used, also, aromatic diamines, such as mixtures of metaphenyline diamine and methylene dianiline etc. are, also, effective hardeners. Other hardening agents may be such compositions as aliphatic polysulfides plus aromatic amino phenols such as 2,4,6-tri(dimethyl aminomethyl) phenol; aliphatic anhydrides, (citraconic anhydride, for example); cyclo aliphatic anhydrides (hexahydrophthalic anhydride), aromatic anhydrides (phthalic anhydride); etc.

The molds for the cast frames, according to the invention, may be made in the final configuration in which the glasses are to be finally finished, that is with the correct bow of the frames across the brow and any vertical curvature that may be required. With the prior art frame, which is made flat and then reheated for shaping, heat and/or moisture may cause the frame to deform, losing their desired shape and even returning to its original flat position or reversed curve. This may readily occur with sunglasses, for instance, left on an automobile dashboard in the sun.

The preferred phenol - epoxy - hardener compositions have a short pot life for economic use of the molds. The preferred mixtures produce a light amber or clear colors on curing. Compatible parting agents make removal of the frames easier, also, aids in cleaning the molds and prolongs mold life. Carefully made molds produce curred epoxy frames requiring little cleaning of parting lines, flash and gates.

What is claimed is:

1. A process for casting eyeglass frames or parts thereof comprising
   (a) forming a liquid mixture of substantially 100% reactive quantities of a dihydric phenol epoxy composition and a hardener,
      (i) said liquid mixture characterized by a viscosity of less than 20,000 centipoises at 25° C.;
      (ii) said liquid mixture being capable of being polymerized or cured at a temperature of approximately 200° F.;
   (b) heating said liquid mixture to decrease its viscosity and enhance ease of degassing
      (i) maintaining the liquid mixture in a pourable liquid-casting condition during said heating;
   (c) casting said preheated mixture into a mold having eyeglass frame or parts cavities of a desired configuration at a rate to prevent formation of gas bubbles in said liquid mixture;
   (d) heating said mold and said contained liquid to a temperature of at least 170° F. sufficient to polymerize or cure said liquid mixture;
   (e) removing polymerized or cured eyeglass frames or parts from said mold at an elevated temperature thereby causing distortion of said frames or parts, degating and removing flash from said frames and parts; and
   (f) subjecting the eyeglass frames or parts to a liquid cooling bath to restore cast configuration
      (i) said eyeglass frames or parts thereof characterized by the property, upon deformation after completion of curing or polymerization, of returning to its original cast configuration when heated to a temperature in the range 100 to 150° F.

2. A process according to claim 1 wherein said liquid mixture is cast under pressure in said mold.

3. A process according to claim 1 wherein said eyeglass cavities are arranged vertically with one lens cavity superposed above the other.

4. A process according to claim 1 wherein said liquid mixture is degassed by placing the same in a vacuum chamber for a short period after mixing.

5. A process according to claim 4 wherein said liquid mixture is degassed by subjecting it to a vacuum of at least about 20 inches of mercury for a period of 5–20 minutes.

6. A process according to claim 1 wherein said liquid resin is fed into the bottom of each cavity in said mold to fill said cavity from the bottom to the top.

7. A process according to claim 1 wherein said eyeglass frame cavity is the final shape of the eyeglass frame and said resin is cast in final configuration substantially without further machining.

8. A process according to claim 1 wherein said epoxy composition has a viscosity of about 500 centipoises at 25° C.

References Cited

UNITED STATES PATENTS

| | | | |
|---|---|---|---|
| 2,658,237 | 11/1953 | Cuppett et al. 18—Rubber Mold Dig. | |
| 2,600,354 | 6/1952 | Wiss | 264—318 X |
| 1,510,001 | 9/1924 | Cunning | 264—328 X |
| 3,406,232 | 10/1968 | Barker | 264—162 |
| 3,708,567 | 1/1973 | Hampel | 264—331 |
| 3,328,499 | 6/1967 | Barnette | 264—255 X |
| 2,673,371 | 3/1954 | Uhlig | 264—237 |
| 1,703,871 | 3/1929 | Curtis | 264—86 UX |
| 1,007,833 | 11/1911 | Wilkinson | 264—348 X |

FOREIGN PATENTS

| | | | |
|---|---|---|---|
| 1,224,910 | 9/1966 | Germany | 264—102 |
| 1,123,166 | 8/1968 | Great Britain | 264—102 |

JAN H. SILBAUGH, Primary Examiner

U.S. Cl. X.R.

264—237, 297, 318, 328